June 10, 1952     H. A. PIETSCH     2,600,020
FORCED AIR FLOW AIR-HEATING FURNACE Filed Nov. 26, 1948     2 SHEETS—SHEET 1

INVENTOR.
HERMAN A. PIETSCH.
BY
Christy, Parmelee, & Strickland
ATTORNEYS.

June 10, 1952 — H. A. PIETSCH — 2,600,020
FORCED AIR FLOW AIR-HEATING FURNACE
Filed Nov. 26, 1948 — 2 SHEETS—SHEET 2
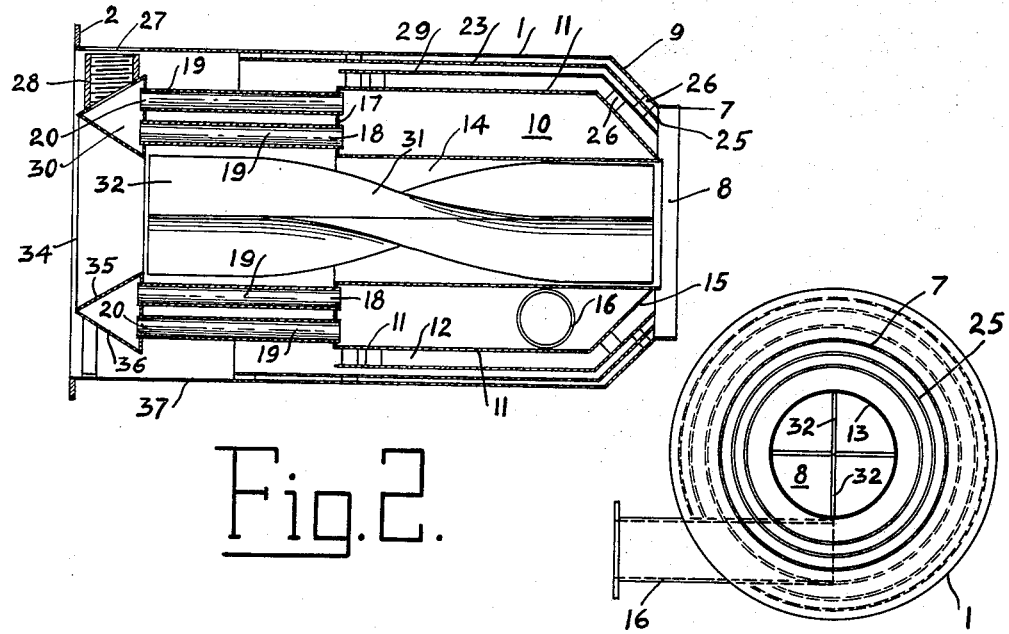
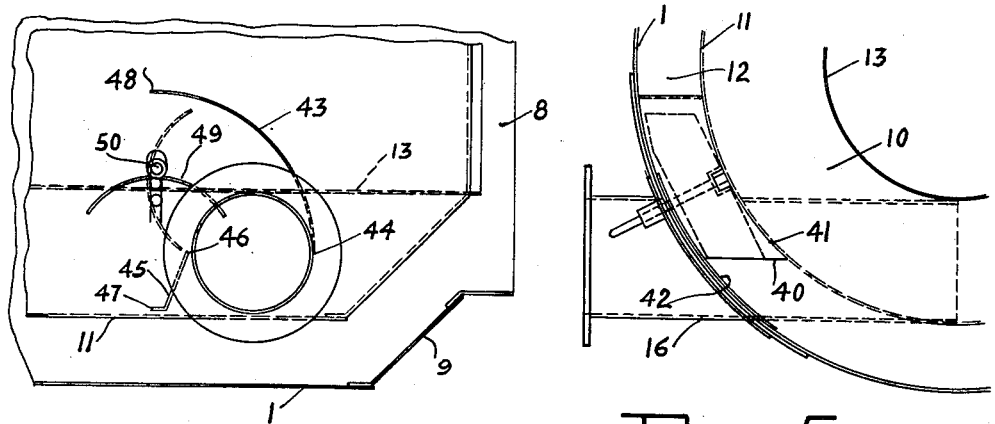
INVENTOR.
HERMAN A. PIETSCH.
BY Christy, Parmelee, & Strickland
ATTORNEYS.

Patented June 10, 1952

2,600,020

UNITED STATES PATENT OFFICE 2,600,020

FORCED AIR FLOW AIR-HEATING FURNACE

Herman A. Pietsch, Greentree Borough, Pa., assignor to Dravo Corporation, Pittsburgh, Pa., a corporation of Pennsylvania Application November 26, 1948, Serial No. 62,138

9 Claims. (Cl. 126—110)

This invention relates to a heating furnace, and, more particularly, to an improved furnace structure for heating air.

The thermal efficiency of heating furnaces is usually dependent upon the heating surface area of the combustion chamber over which the air to be heated is passed. Conventional heating furnaces are generally provided with combustion chambers having a cylindrical shape which must be of a large size in order to provide the heating surface area necessary for satisfactory thermal efficiency. In such furnaces a reduction in size can only be had with a corresponding undesirable decrease in the thermal efficiency of the furnace. Conventional furnaces of sufficient size to give a satisfactory thermal rating are expensive to build by reason of the large amount of metal required. Obviously, a reduction in the size of the furnace without sacrificing thermal efficiency will result in a saving in the cost of construction of the furnace in addition to reducing the space which will be occupied thereby.

One of the principal objects of this invention is to provide an improved furnace construction which will both reduce cost of construction and the size of the furnace while providing at least equal thermal efficiency as compared to conventionally constructed furnaces.

A further object of the invention is to provide an improved furnace structure in which the heating area over which the air is passed is materially increased for a given over-all size of furnace.

Another object of the invention is to provide a furnace structure in which the space required for combustion of fuel is decreased and which at the same time provides a maximum amount of heating surface area.

To the accomplishment of the above and related ends of the invention, there is provided a furnace having a cylindrical casing in which is mounted an annular combustion chamber. The outer surface of the annular combustion chamber is spaced from the inner surface of the furnace casing so as to provide an annular heating surface around the combustion chamber and a cylindrical heating space centrally through which air to be heated may pass. The fuel for the combustion chamber is fed thereto in a tangential direction so that the products of combustion will move through the combustion chamber in a spiral path. The products of combustion leave the combustion chamber through a plurality of tubes which further increase the heating area and deliver the products of combustion to an exhaust manifold which is provided with a connection to a flue. Radiation members are mounted in the annular and central heating spaces and are heated by radiation from the annular combustion chamber. Air is passed through the furnace casing in a direction opposite to the flow of the products of combustion therethrough. This air passes over the surfaces of radiation members which in effect increase the heating surface area of the furnace.

In the drawings there are shown several embodiments of the invention. In this showing:

Fig. 2 is a vertical sectional view of a modified form of furnace;

Fig. 3 is an end elevation view looking from the right of either Figs. 1 or 2;

Fig. 4 is a fragmentary sectional view showing a structure for supplying the air for combustion to the fuel feed pipe; and Fig. 5 is a fragmentary sectional view illustrating an end elevation of the structure shown in Fig. 4.

Figure 1:
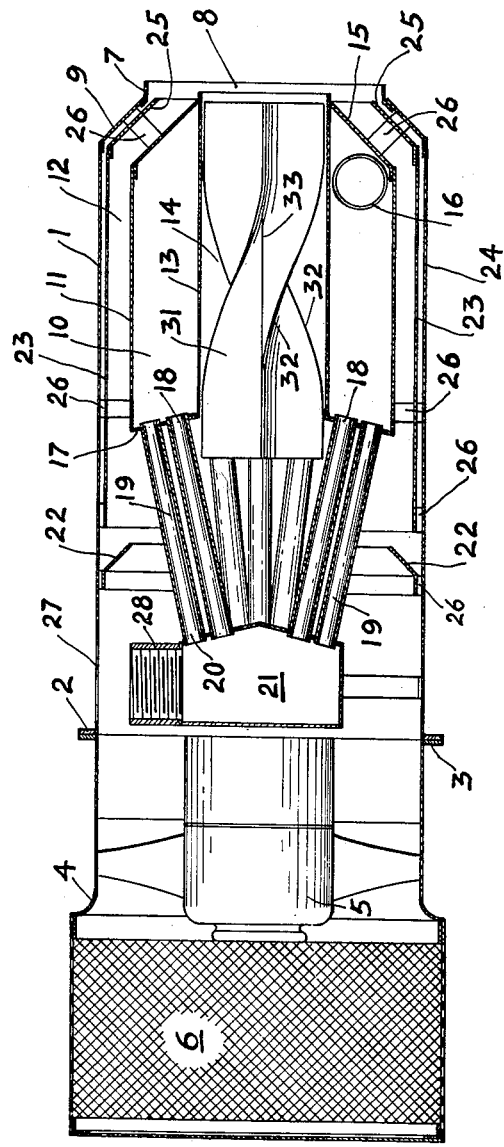
Fig. 1 is a vertical sectional view of a furnace illustrating the preferred embodiment of the invention.

Referring to Figs. 1 and 2 of the drawings, the numeral 1 designates a cylindrical shell providing the casing or housing for the furnace. An annular flange 2 is provided at one end of the casing 1 for connection to a flange 3 of an air supply unit 4 having a fan 5 and a filtering unit 6 therein as shown in Fig. 1. The other end of the shell 1 is provided with a cylindrical collar 7 defining an opening 8 to the furnace. The collar 7 is connected to the shell 1 by an annular member 9 having the shape of a truncated cone which provides a surface angularly converging toward the opening 8 for a purpose to be described. An annular combustion chamber 10 is mounted concentrically within the casing 1. The combustion chamber 10 comprises an outer cylindrical shell 11 spaced from the casing 1 to provide an annular heating space 12 and an inner cylindrical shell 13 defining a cylindrical heating space 14. Adjacent the opening 8, the combustion chamber 10 is closed by an annular end member 15 having a shape similar to and concentric with the casing member 9. A fuel supply pipe 16 extends through the casing 1 and the outer shell 11 of the combustion chamber 10 in a direction tangential to the combustion chamber 10 so that fuel, either gas or liquid fuel, will be delivered thereto in a tangential direction for a purpose to be described. The parts thus far described are identical in the showings of Figs. 1, 2, and 3.

Referring now to Fig. 1, the other end of the combustion chamber is closed by an annular plate 17 having a plurality of openings 18 therein arranged in two annular paths. Each of the openings has secured therein one end of a heating tube 19 which has its other end secured in an opening 20 formed in an exhaust manifold 21 having a generally cylindrical shape. The exhaust manifold 21 is mounted concentrically within the casing 1, and has a diameter less than the outer diameter of the combustion chamber 11. The heating tubes 19 converge angularly with respect to the axis of the casing 1 in a direction toward the exhaust manifold 21 in order to facilitate the passage of air over such heating tubes. An annular deflecting ring 22 is secured to the casing 1 for deflecting air to be heated toward the center of the casing and over the tubes 19. The ring 22 is spaced from the casing 1 to allow some air to pass thereby. Although Fig. 1 shows only four heating tubes in section, it will be understood that such pipes are distributed throughout the annular area of the annular plate 17. A radiation shield 23 is mounted concentrically in the casing 1 and is spaced from the casing 1 to provide an annular space 24 through which the air to be heated may pass. The space between the ring 22 and casing 1 allows air to pass thereby into the space 24. The shield 23 is provided with an annular extension 25 having a shape similar to and which is mounted concentrically with the end casing member 9. The radiation shield 23 and combustion chamber 10 are together with the deflecting ring 22 mounted and secured together in concentric relation within the casing 1 by a plurality of spacer elements 26.

The casing 1 is provided with an opening 27 through which a flue (not shown) may be connected by a threaded coupling 28 to the interior of the exhaust chamber 21 for carrying away the products of combustion from the furnace.

The furnace shown in Fig. 2 differs from that shown in Fig. 1 in that it is provided with an additional radiation shield 29 spaced inwardly from the shield 23. In addition, the heating tubes 19 are arranged parallel to the axis of the casing 1 in place of the angular arrangement shown in Fig. 1. In place of the cylindrical exhaust chamber 21 there is provided an annular exhaust chamber 30 having a substantially triangular section.

An air control structure is mounted in the annular space 14 to control the flow of air therethrough. The structure 31 comprises four metal sheets or air vanes 32 connected together along a common line 33. The vanes 32 are twisted through an angle of 90° so that they will be effective to impart a swirling action to the air passing through the cylindrical heating space 14. Due to the converging arrangement of the heating tubes 19 in Fig. 1, the structure 31 therein is of a shorter length than the structure 31 shown in Fig. 2.

A better understanding of the invention will be had by referring to its operation. A combustible mixture of fuel is fed by the pipe 16 to the combustion chamber 10 in a tangential direction. The burning fuel in traveling to the outlet openings 18 will move in a spiral path and with a swirling action. Suitable metal alloy spiral baffles (not shown) may be employed to insure the swirling action of the gases moving through the chamber 10. As the products of combustion move into the pipes 19 the flow is streamlined and the movement of the products of combustion through the pipes 19 will be at an increased velocity to increase the transfer of heat thereto. The spiral travel of the burning fuel through the combustion chamber 1 will maintain the burning fuel therein for a maximum length of time and thereby enable the transfer of maximum heat to the inner and outer members 13 and 11. The streamlined flow and increased velocity of the products of combustion through the tubes 19 will effect a further transfer of heat to such tubes. The products of combustion moving into the exhaust chamber 21 will effect the heating of this chamber and the gases passing out through the flue connection 28 will thus be at a relatively low temperature. The air to be heated is forced by the fan 5 in a direction from left to right as viewed in Figs. 1 and 2, which direction is opposite to that of the flow of the products of combustion through the furnace. This air will be heated initially by contact with the exhaust manifold 21. The air will flow around the exhaust manifold 21 and a portion thereof will be deflected by the inclined deflecting plate 22 toward the center of the furnace. The air deflected will pass over the tubes 19 and absorb heat therefrom and will then flow through the cylindrical heating space 14 wherein heat will be convected away from the cylindrical shell 13 of the combustion chamber 10. The remainder of the air will pass through the annular heating space 12 and the annular space 24. This air will absorb heat from the outer shell 11 by convection. In operation, the inner and outer shells 11 and 13 give up considerable heat by radiation. The heat radiated by the shell 11 is absorbed by the radiation shield 23 and the heat radiated by the shell 13 is absorbed by the structure 31. The radiated heat absorbed by the radiation shield 23 and by the structure 31 is then given up to the air passing over and contacting the surfaces of these elements. It will thus be seen that the structure 31 and the radiation shield 23 are effective to materially increase the heating surface area within the furnace 11.

As the air leaves the annular heating spaces 12 and 24 it is deflected toward the opening 8. The angular arrangement of the elements 9 and 25 is effective to so control the flow of air that air will be moving over and in contacting engagement with the plate 15 at all times. In this manner, the air deflected against the surface 15 is effective to prevent overheating of the end 15 of the combustion chamber and to prevent damage thereto by overheating.

The operation of the furnace structure shown in Fig. 2 is similar to the operation of the structure shown in Fig. 1. In the showing of Fig. 2 the plates 23 and 29, and the structure 31 absorb heat by radiation which is given up by convection to the air being heated. In the structure shown in Fig. 2 the particular shape of the exhaust chamber 30 provides a desirable feature. The air coming from the fan will strike the pointed edge 34 of the exhaust chamber 30 and will be divided thereby into two portions. The central portion will flow over the surface 35 and will be directed by the vanes 32 through the central heating space 14. The portion of air flowing over the surface 36 will be conducted to the annular heating space 12 and to the annular spaces around the radiation shields 23 and 29. A portion of the air flowing over the surface 36 will strike the inner surface 37 of the casing 1 and will be deflected in a direction inwardly therefrom and over the heating tubes 19. The annular pointed edge 34 is so arranged that the air delivered to the central heating space 14 and to the annular heating space 12 is proportioned to the heating surface areas provided in such spaces. The air delivered to the central heating space 14 is proportioned to the heating surface areas provided by the structure 31 and by the inner surface 13 of the combustion chamber 10. The air delivered to the heating space 12 is proportioned to the heating surface areas provided by the outer shell 11 of the combustion chamber 10 and the radiation shields 23 and 29. In order to increase the amount of air delivered to the center heating space 14, the exhaust chamber 35 will be formed to provide an increased diameter of its apex or pointed edge 34. To decrease the air delivered to the central heating space 14, the diameter of the exhaust chamber apex 34 would be decreased. Changes in the diameter of the apex 34 will effect corresponding changes in inverse relation of the air delivered to the outer heating space 12.

The air necessary to support combustion of the fuel in the chamber 10 may be mixed with the fuel prior to delivery to the pipe 16. In place of premixing the air for combustion with the fuel, the structure shown in Figs. 4 and 5 may be employed. This structure takes preheated air from the annular heating space 12 and introduces it into the pipe 16 for movement with the fuel into the combustion chamber 10. Referring to Figs. 4 and 5, it will be noted that the upper half of the pipe 16 which is positioned within the annular space 12 is removed by cutting out a section above the diametrical plane 40 and between the arcuate lines 41 and 42. A vane 43 is connected at 44 to one side of the pipe opening and extends upwardly into the annular space 12 between the members 1 and 11. A vane 45 is connected at 46 to the other side of the pipe opening. Air moving into the space between the edges 47 and 48 of the vanes 43 and 45 will thus be forced into the pipe 16 where it will be mixed with the fuel 16 flowing through the pipe. A damper 49 pivoted on the shaft 50 is provided for controlling the amount of air admitted to the pipe 16. When the damper 49 is in the position shown in solid lines a maximum amount of air will be delivered to the pipe 16. When the damper 49 is in the position shown by the dotted lines a minimum amount of air will be admitted to the pipe 16. The damper 49 and vane 43 are curved as illustrated in Fig. 4. The curvature of these elements will impart a rotary movement to the air moving into the pipe 16 in order to effect a more intimate mixture of the air and fuel.

A furnace constructed in accordance with this invention has a further advantage in that it is equally adapted for use with gaseous or liquid fuels. Where liquid fuels are employed, a vaporized or atomized mixture of fuel and air is fed thereto through the pipe 16.

By the use of a furnace constructed in accordance with the principles of this invention, it will be found that the overall size of a furnace of given capacity may be decreased while providing equal or better than equal efficiency as compared to conventional furnace structures. This improvement in thermal efficiency and decrease in size is effected by the provision of an annular combustion chamber together with the manner in which the fuel is fed tangentially thereto and the radiating structure employed in connection therewith. As pointed out above, it will be noted in particular that the radiation structure positioned interiorly and exteriorly of the combustion chamber is effective to provide a considerable increase in area of the heating surface available. By reason of these features, it will thus be seen that the overall size of the furnace may be reduced without a sacrifice of heating area and a corresponding sacrifice in thermal efficiency. A furnace constructed in accordance with this invention and having an outer diameter of about 20 inches and a length of about 36 inches between the flange 2 and the opening 8 will be found to have an input capacity of about 200,000 B. t. u.'s, and a thermal efficiency at least equal to conventional hot air heaters. This capacity is approximately twice that needed by the average six room home in a cold climate.

In the preferred practice of the invention, the furnace is mounted horizontally as illustrated in Figs. 1 and 2, and the fan 5 is connected so as to deliver air heated thereby in a direction opposite to that of the flow of the products of combustion through the furnace. However, it will be understood that the air to be heated may be forced through the furnace in an opposite direction if so desired. It will also be understood that the furnace may be mounted vertically or inverted, and further that gravity may be employed to force air therethrough.

While I have illustrated and described one specific embodiment of my invention, it will be understood that this is merely by way of illustration, and that various changes and modifications may be made therein within the contemplation of my invention and under the scope of the following claims.

I claim:

1. In a heating furnace, a cylindrical casing, an annular combustion chamber mounted in said casing with its outer wall spaced from said casing to define an annular heating space and its inner wall defining a cylindrical heating space, an annular plate closing one end of said chamber, means at the other end of said chamber providing an exit for products of combustion comprising a second annular plate defining the other end of said combustion chamber and having a plurality of openings therein, a cylindrical exhaust manifold spaced from said chamber and mounted concentrically in said casing with its axis aligned with the axis of said cylindrical heating space, said exhaust chamber having a plurality of openings therein, and a plurality of heating tubes connecting said exhaust chamber with said annular combustion chamber, said tubes being mounted in such manner that each of said exhaust manifold openings has communication with said combustion chamber through one of said tubes and one of said annular plate openings, said tubes being mounted so that they converge angularly from said second annular plate toward the axis of said manifold, means for forcing air through said casing in a direction opposite to the direction of travel of the products of combustion to said manifold, and a deflecting ring secured to said casing intermediate said combustion chamber and manifold for deflecting air toward the center of said casing and over said heating tubes.

2. In a heating furnace, a cylindrical casing, an annular combustion chamber mounted in said casing with its outer wall spaced from said casing to define an annular heating space and its inner wall defining a cylindrical heating space, an annular plate closing one end of said chamber, and means at the other end of said chamber providing an exit for products of combustion comprising a second annular plate defining the other end of said combustion chamber and having a plurality of openings therein, an annular exhaust manifold mounted concentrically in said casing and spaced from said combustion chamber, said exhaust manifold having a plurality of openings therein, and a plurality of heating tubes connecting said combustion chamber with said manifold, said tubes being mounted so that each of said manifold openings has communication with said combustion chamber through one of said tubes and one of said annular plate openings.

3. In a heating furnace, a cylindrical casing, an annular combustion chamber mounted in said casing with its outer wall spaced from said casing to define an annular heating space and its inner wall defining a cylindrical heating space, an annular plate closing one end of said chamber, and means at the other end of said chamber providing an exit for products of combustion comprising a second annular plate defining the other end of said combustion chamber and having a plurality of openings therein, an annular exhaust manifold mounted concentrically in said casing and spaced from said combustion chamber, said exhaust manifold having a plurality of openings therein, and a plurality of heating tubes connecting said combustion chamber with said manifold, said tubes being mounted so that each of said manifold openings has communication with said combustion chamber through one of said tubes and one of said annular plate openings, and means for forcing air through said casing in a direction opposite to the flow of the products of combustion through said chamber, said annular manifold controlling the portion of air delivered to said annular heating space and the portion of air delivered to said cylindrical heating space.

4. In a heating furnace, a cylindrical casing, an annular combustion chamber mounted in said casing with its outer wall spaced from said casing to define an annular heating space and its inner wall defining a cylindrical heating space, said chamber being closed at one end thereof and having an exhaust at the other end thereof providing an exit for products of combustion from said chamber, and fuel supply means arranged tangentially adjacent said closed end for delivering fuel into said chamber in a tangential direction so that the products of combustion will move in a spiral path through said chamber as they travel toward said exhaust, a cylindrical radiation shield mounted concentrically with respect to said casing and combustion chamber in said annular heating space for absorbing heat from said outer wall by radiation, an air control structure comprising air vanes extending outwardly from and connected along an axial line of said cylindrical heating space for imparting a spiral movement to the air moving through said space, said vanes being effective to absorb heat from said inner wall by radiation, and means for forcing air through said cylindrical and annular heating spaces to absorb heat from the surfaces of said inner and outer walls, said air control structure, and said radiation shield.

5. In a heating furnace, a cylindrical casing, an annular combustion chamber mounted in said casing with its outer wall spaced from said casing to define an annular heating space and its inner wall defining a cylindrical heating space, an annular plate closing one end of said combustion chamber, and extending between said inner and outer walls, each segmental portion of said plate being inclined angularly with respect to the axis of said combustion chamber and having its angle of inclination extending in a direction converging from said outer wall toward the end of said casing at the said one end of said combustion chamber, a fuel supply pipe extending tangentially into said combustion chamber at a point adjacent said annular plate for delivering fuel in a tangential direction into said chamber, an annular deflecting plate secured to one end of said casing in concentric relation with and parallel to said first annular plate, and means for forcing air through said annular heating space, said deflecting plate being operable to direct the stream of air flowing through said annular space over said first annular plate to prevent overheating of said first annular plate.

6. In a heating furnace, a cylindrical casing, an annular combustion chamber mounted in said casing with its outer wall spaced from said casing to define an annular heating space and its inner wall defining a cylindrical heating space, a fuel supply pipe extending through said casing, said annular heating space, and said outer wall into said annular combustion chamber, the portion of said pipe positioning within said annular heating space having a part cut out to provide an opening therein, and vanes extending from said opening for deflecting air from said annular heating space into said pipe through said opening to provide at least a part of the air necessary for the combustion of the fuel entering said combustion chamber.

7. In a heating furnace, a cylindrical casing, an annular combustion chamber mounted in said casing with its outer wall spaced from said casing to define an annular heating space and its inner wall defining a cylindrical heating space, a fuel supply pipe extending through said casing, said annular heating space, and said outer wall into said annular combustion chamber, the portion of said pipe positioning within said annular heating space having a part cut out to provide an opening therein, vanes extending from said opening for deflecting air from said annular heating space into said pipe through said opening to provide at least a part of the air necessary for the combustion of the fuel entering said combustion chamber, and a damper adjacent said vanes for controlling the amount of air deflected by said vanes into said pipe.

8. In a heating furnace, a cylindrical casing, an annular combustion chamber mounted in said casing with its outer wall spaced from said casing to define an annular heating space and its inner wall defining a cylindrical heating space, an annular plate closing one end of said chamber, and means at the other end of said chamber providing an exit for products of combustion comprising a second annular plate defining the other end of said combustion chamber and having a plurality of openings therein, an exhaust manifold spaced from said chamber and mounted concentrically in said casing with its axis aligned with the axis of said cylindrical heating space, said exhaust manifold having a plurality of openings therein, and a plurality of heating tubes connecting said exhaust manifold with said annular combustion chamber, said tubes being mounted in such manner that each of said exhaust manifold openings has communication with said combustion chamber through one of said tubes and one of said annular plate openings, a cylindrical radiation shield mounted concentrically with respect to said casing and combustion chamber in said annular heating space for absorbing heat from said outer wall by radiation, an air control structure comprising air vanes extending outwardly from and connected along an axial line of said cylindrical heating space for imparting a spiral movement to the air moving through said space, said vanes being effective to absorb heat from said inner wall by radiation, and means for forcing air to be heated through said casing in a direction opposite to the flow of the products of combustion to said exhaust manifold to absorb heat from the exposed surfaces of said exhaust manifold, heating tubes, the inner and outer walls of said combustion chamber, radiation shield, and air control structure.

9. In a heating furnace, a cylindrical casing, an annular combustion chamber mounted in said casing with its outer wall spaced from said casing to define an annular heating space and its inner wall defining a cylindrical heating space, said chamber being closed at one end thereof and having an exhaust at the other end thereof providing an exit for products of combustion from said chamber, and fuel supply means arranged tangentially adjacent said closed end for delivering fuel into said chamber in a tangential direction so that the products of combustion will move in a spiral path through said chamber as they travel toward said exhaust, an air control structure comprising air vanes extending outwardly from and connected along an axial line of said cylindrical heating space for imparting a spiral movement to the air moving through said space, said vanes being effective to absorb heat from said inner wall by radiation, and means for forcing air through said cylindrical and annular heating spaces to absorb heat from the surfaces of said inner and outer walls, and said air control structure.

HERMAN A. PIETSCH.

REFERENCES CITED

The following references are of record in the file of this patent:

UNITED STATES PATENTS

| Number | Name | Date |
|---|---|---|
| 563,240 | McCowatt | June 30, 1896 |
| 764,191 | Hoesman | July 5, 1904 |
| 901,829 | Ramaley | Oct. 20, 1908 |
| 1,519,673 | Doble | Dec. 16, 1924 |
| 1,545,710 | Tooher | July 14, 1925 |
| 2,431,772 | Russell | Dec. 2, 1947 |
| 2,451,851 | McCollum | Oct. 19, 1948 |